Patented July 11, 1933

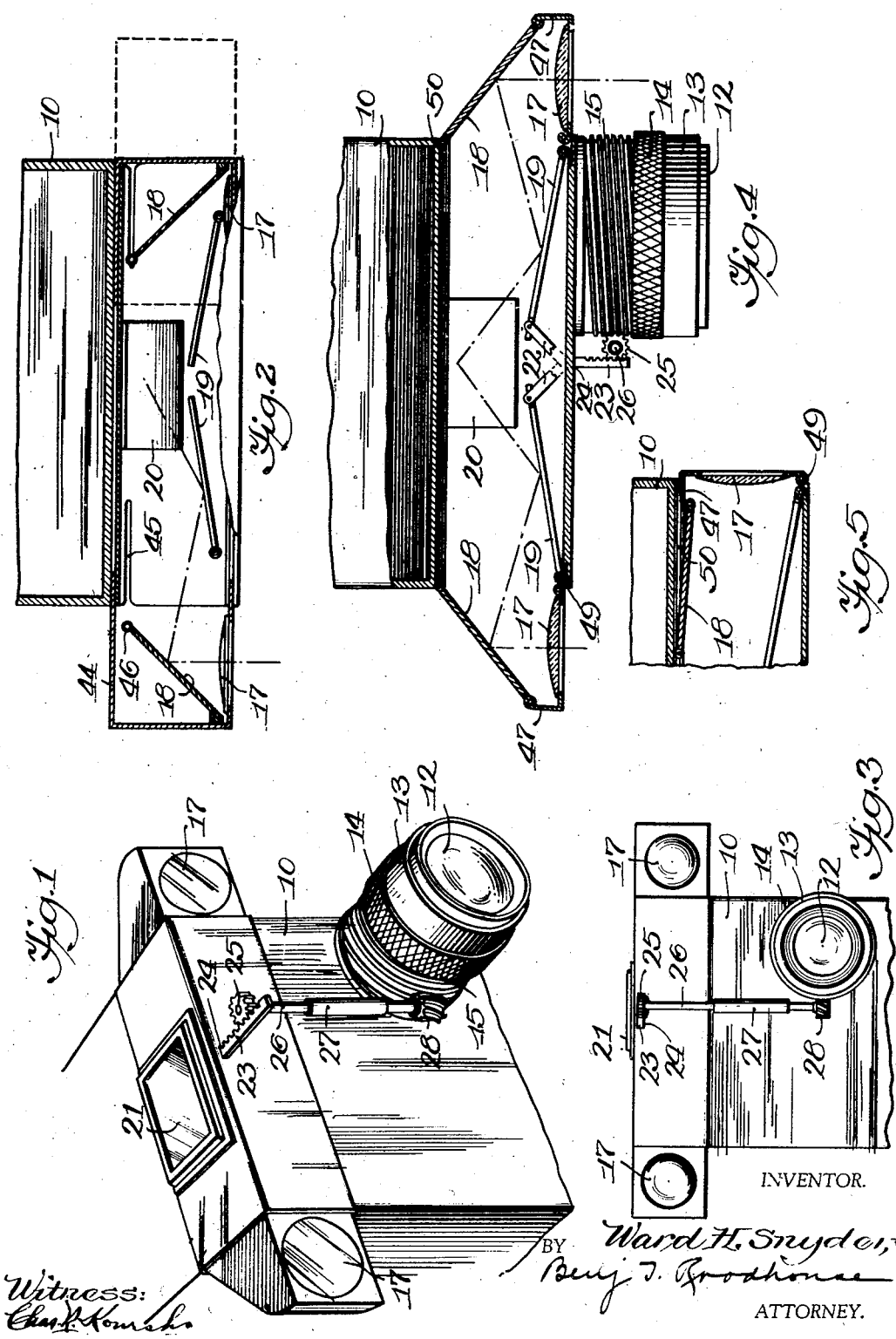

1,918,143

UNITED STATES PATENT OFFICE

WARD H. SNYDER, OF CHICAGO, ILLINOIS, ASSIGNOR OF ONE-THIRD TO FRANK F. FARKAS AND ONE-THIRD TO E. N. FARKAS, BOTH OF CHICAGO, ILLINOIS

ADJUSTMENT INDICATING MECHANISM FOR CAMERAS

Application filed January 11, 1929. Serial No. 331,912.

My present invention relates to the provision of adjustment indicating mechanism for cameras. As is well known, the camera must be suitably positioned to take in the desired view. It must also be adjusted so that the lens will define the view as required.

There is a further adjustment of the lens shutter for securing the desired length of exposure which need not concern us in the present application inasmuch as the apparatus is applied to a motion picture camera where the exposures are necessarily brief and the present practice is to restrict the adjustments to focusing and diaphragming movements. A finder, or auxiliary camera device, is generally employed for ascertaining the positioning of the camera for securing the requisite view, and it has been my object to provide instrumentalities which will indicate in the finder the result of the focusing adjustments which are made to the camera. The focusing adjustment has heretofore required the ascertainment of the distance from the camera to the object of which a picture is desired or the estimation or other evaluation of such distance.

I have provided means in connection with the finder and link those means with the focusing instrumentalities of the camera whereby when the image in the finder is in desired focus the camera lens will also be in a position to focus properly the same object.

It will be seen that through the provision of these instrumentalities the operator will directly see in the finder by reason of the obscuring of the image therein, the lack of definition in its focus, whether he has made the necessary camera adjustments and also when these adjustments have been made satisfactorily.

It will also be hereafter seen that I have provided means for extending and folding up the finder whereby, when the finder is extended, the focusing indicating mechanism will be more sensitive and accurate and when the finder is folded or in closed position it will be relatively as compact and as easily stowed as the camera could be stowed without the finder.

I have accomplished the above enumerated objects by means of the mechanism illustrated in the accompanying drawing, in which—

Fig. 1 is a perspective of a portion of a front end of a motion picture camera equipped with my mechanism;

Fig. 2 is a view of the finder, a portion of the top being broken away to disclose the interior arrangement and one end thereof being in folded position, the extended position being shown in dotted lines;

Fig. 3 is a front elevation of the structure shown in Fig. 1;

Fig. 4 is a view similar to the one shown in Fig. 2, showing in detail the linkage between the camera and finder focusing mechanism and also showing a modified finder folding construction;

Fig. 5 is a fragmental detail of the modified folding construction, shown in Fig. 4, in folded position.

Similar reference characters refer to similar parts throughout the respective views.

I have schematically illustrated a motion picture camera as a rectangular casing 10 in the front of which is mounted a lens 12 which is focused by the rotation of an exterior sleeve 13 provided with a raised knurled collar 14 for the more convenient rotation of the sleeve. The structure thus far described is embodied in at least one form of motion picture camera and constitutes no portion of the present invention.

I provide upon the portion of the sleeve 13, posterior to the knurled collar 14, threads 15.

The top forward portion of the camera is recessed to receive the finder casing, forms of which are illustrated in the respective figures. The modification relates wholly to the method of collapsing or folding the finder and both forms comprise a pair of lenses 17 mounted respectively at opposite ends of the finder. Immediately behind the lenses 17 are obliquely disposed reflectors 18, and pivoted at points between the inner edges of the lenses and the center of the finder are reflectors 19. Centrally of the finder and rising obliquely and rearwardly from the bottom thereof is a reflector 20 immediately above which in the top of the finder is an image receiving screen 21. Light entering the lenses 17 is reflected from the reflectors 18 to the reflectors 19 and from thence to the reflector 20 from whence it goes to the screen 21. By changing the angle of the reflectors 19 the images received through the respective lenses may be caused to coincide and the amount of movement requisite in causing the images to coincide has a direct relation to the distance from the camera of the object it is desired to photograph.

In order to link the focusing of the camera lens 12 with the movements of the reflectors 19 I pivotally secure adjacent the unattached ends of the respective reflectors 19, links 22, the other end of which links are pivoted to a rack bar 23 extending through a slot 24 in the upper and central portion of the finder. The teeth of this rack bar 23 engage with a gear 25 upon the top of a shaft 26 which rotates in a journal 27 secured to the front wall of the camera. The shaft 26 extends through and below the journal 27 and upon its lower end is a worm gear 28 engaging with the threads 15 upon the sleeve 13.

By properly proportioning the pitch of the threads 15 and the gears 28 and 25 the focusing movement of the lens 12 is so related to the movement of the reflectors 19 that when the images of an object in front of the camera coincide upon the screen 21 the camera lens will be in adjustment to properly focus the image of that object.

The method for securing the collapsing or folding of the finder, shown in Fig. 2, consists of mounting the lenses 17 and reflectors 18 in rectangular casings 44 which telescope with the central portion of the finder, there being suitable slots 45 in the top and bottom walls of the central portion of the finder casing to accommodate the ends of the positioning pin 46 for the inner ends of the reflectors 18, whereas in the form of folding mechanism shown in Figs. 1, 4 and 5, the ends 47 of the finder in which the lenses 17 are mounted are pivoted at 49 to the central portion of the front wall of the finder while the forward ends of the reflectors 18 are pivoted to the ends 47 and the rear ends of the reflectors 18 are pinned into slots 50 arranged at the rears of the top and bottom walls of the finder so that the ends may be folded, as clearly shown in Fig. 5.

Having described my invention what I claim as new and desire to secure by Letters Patent is:—

1. In combination with a camera, a finder therefor, a pair of lenses for said finder, a single screen for said lenses, a movable reflector for each of said finder lenses, and means actuated by the focusing adjustment of the camera for moving said respective reflectors and impairing the image in the finder when the camera lens is not in focus with such image.

2. In combination with a camera a finder therefor comprising a plurality of lenses, an image receiving screen and a reflector system having movable elements for securing the moving and merging of the images from the respective lenses and means linking the focusing movement of the camera with the movable elements of said reflector system whereby the images in focus in the camera lens are in coincidence upon the image receiving screen of the finder.

3. In a camera in which the focusing thereof is accomplished by the rotation of the lens barrel, threads provided upon said lens barrel, a gear engaging said threads, a gear actuated by the movement of said first mentioned gear and a rack engaging said last mentioned gear, links connecting said racks, lenses, movable reflectors co-operating with said lenses and connected to said links and a reflector and a screen co-operable with said movable reflectors whereby the focusing of said camera controls the image produced on said screen.

4. In combination with a camera a finder, the ends whereof fold within the central portion, lenses mounted in said foldable ends, an image receiving screen, a reflector system having movable elements for reflecting the images formed by said lenses upon the said screen and means actuated by the focusing adjustment of said camera co-acting with the movable elements of said reflector system.

WARD H. SNYDER.